(12) United States Patent  
Ozbek et al.

(10) Patent No.: US 6,684,160 B1
(45) Date of Patent: Jan. 27, 2004

(54) MARINE SEISMIC ACQUISITION SYSTEM AND METHOD

(75) Inventors: Ali Ozbek, Milton (GB); James Martin, Hovik (NO); Nils Lunde, Haslum (NO); Simon Hastings Bittleston, Bury St Edmunds (GB)

(73) Assignee: WesternGeco, Houston, TX (US)

( * ) Notice: Subject to any disclaimer, the term of this patent is extended or adjusted under 35 U.S.C. 154(b) by 0 days.

(21) Appl. No.: 09/673,491
(22) PCT Filed: May 14, 1999
(86) PCT No.: PCT/GB99/01544

§ 371 (c)(1),
(2), (4) Date: Oct. 16, 2000

(87) PCT Pub. No.: WO99/60421

PCT Pub. Date: Nov. 25, 1999

(30) Foreign Application Priority Data

May 20, 1998 (GB) .............................. 9810706

(51) Int. Cl.$^7$ ................................. G01V 1/36
(52) U.S. Cl. ............................. 702/17; 367/20
(58) Field of Search .................. 702/17; 181/120; 367/20, 21, 52, 38, 58, 22

(56) References Cited

U.S. PATENT DOCUMENTS

| 4,254,480 A | * | 3/1981 | French | 367/58 |
| 4,319,347 A | * | 3/1982 | Savit | 367/52 |
| 4,744,064 A | * | 5/1988 | Hughes | 367/22 |
| 4,821,241 A | * | 4/1989 | Berglund | 367/20 |
| 5,251,183 A | * | 10/1993 | McConnell et al. | |
| 5,351,218 A | * | 9/1994 | Hatteland et al. | 367/20 |
| 6,446,008 B1 | * | 9/2002 | Ozbek | 702/17 |

FOREIGN PATENT DOCUMENTS

| GB | 2180341 A | * | 4/1987 | G01V/1/20 |

* cited by examiner

Primary Examiner—Kamini Shah
Assistant Examiner—Victor J. Taylor
(74) Attorney, Agent, or Firm—Williams, Morgan & Amerson

(57) ABSTRACT

A method and system for performing a marine seismic survey is described, including towing at least one seismic streamer comprising a plurality of hydrophones distributed at average intervals of not more than 625 cm therealong in the water over the area to be surveyed; directing acoustic signals down through the water and into the earth beneath; receiving with the hydrophones seismic signals reflected from strata in the earth beneath the water; digitizing the output of each hydrophone separately; and filtering the output to reduce the noise present in the output and to generate a signal with a reduced noise content wherein the filtering process uses as further input the digitized output of at least one nearby hydrophone. The filtering is applied to single sensor recording prior to group-forming and thus able to detect and reduce coherent noise with a coherency length of 20 meters or less. It reduces noise such as streamer or bulge noise.

9 Claims, 2 Drawing Sheets

MARINE SEISMIC ACQUISITION SYSTEM AND METHOD

BACKGROUND OF THE INVENTION

1. Field of the Invention

This invention relates to marine seismic surveying, and is more particularly concerned with noise reduction methods and apparatus for use in marine seismic survey.

2. Description of Related Art

In order to perform a 3D marine seismic survey, a plurality of seismic streamers, each typically several thousand metres long and containing arrays of hydrophones and associated electronic equipment distributed along its length, and towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones in the streamers, digitized and then transmitted to the seismic survey vessel, where they are recorded and at least partially processed with the ultimate aim of building up a representation of the earth strata in the area being surveyed.

Typically up to 12 streamers are towed, each streamer being several kilometers long. The streamers are made up of sections which may be typically 100–200 meters long; each section consists of hydrophones inside an outer skin which may be filled with oil, foam, or a more solid substance. Sress-wires and spacers for the internal skeleton of the streamer.

The signals received by the hydrophones in the streamers are invariably contaminated by noise from a variety of sources. The lurching of the vessel, especially in rough seas, causes vibrations in the stress-wires which interact with the connectors and the oil-filled skin, generating bulge waves (or breathing waves) which propagate down the streamers. The pressure variations are detected by the hydrophones, adding noise and corrupting the detected seismic signals. As the streamer moves through the water, boundary layer turbulence causes pressure fluctuations at the outer skin wall, which are again coupled to the hydrophones.

Bulge waves may also be caused by eddy shedding under elliptical water motion about the streamer caused by wave action. Currently, one of the main techniques used to reduce this noise involves hard-wiring groups of adjacent hydrophones together, to sum their respective analogue output signals: typically, a group contains eight uniformly-spaced hydrophones, and the centres of the groups are typically spaced at 6.25 meter intervals. Such an arrangement is disclosed in our U.S. Pat. No. 5,351,218, which also describes how pairs of adjacent groups can be selectively connected together to form groups of sixteen adjacent hydrophones whose group centres are spaced at 12.5 meter intervals.

Since the individual hydrophones in each group are fairly closely spaced, at typically just under 90 cm apart, it is assumed that all the hydrophones in a given group receive substantially the same seismic signal. The seismic signal is therefore reinforced by the summing of the analogue output signals of the hydrophones of the group, while the noise affecting each hydrophone, if it is randomly uncorrelated, will tend to be cancelled out by the summing process. The groups of eight or sixteen hydrophones can thus be considered equivalent to single hydrophones with a 6.25 or 12.5 meter spacing, a gain of eight or sixteen in relation to an individual hydrophone within a group, and providing quite good rejection of random noise.

However, a significant source of the noise affecting the hydrophones is the motion of the surface of the water in the area of the survey due to waves and swell. Noise due to waves or swell, which will hereinafter be referred to simply as "swell noise", is not truly random in relation to the groups of eight or sixteen hydrophones of the prior art, so that the summing of the analogue output signals of the hydrophones in each group is not very effective in reducing it. Furthermore, the significance of swell noise increases dramatically as the height of the waves or swell increases, to the extent that when the weather causes the height to exceed a certain level, typically 2 to 4 meters, the signal-to-noise ratio deteriorates so much that the survey has to be suspended until the weather improves. This "weather downtime" can add substantially to the overall cost of the survey.

A method of applying adaptive signal processing to the attenuation of bulge waves is described U.S. Pat. No. 4,821,241. There it is proposed to co-locate stress sensors with the hydrophones in the streamer. The stress sensors are responsive to mechanical stresses applied to the cable, but are substantially unresponsive to acoustic waves propagating in fluid media. The signal outputs from the stress sensors are combined with the signal outputs from the corresponding co-located hydrophones to cancel spurious signals due to bulge waves.

Another method of applying adaptive signal processing to the attenuation of bulge waves is described U.S. Pat. No. 5,251,183. In this patent it is proposed to use an accelerometer secured between the lead-in section of the streamer and the hydrophone. Intra-shot and inter-shot accelerometer and hydrophone signals are recorded. The method utilizes inter-shot and intra-shot adaptive processing loops. The inter-shot adaptive processing loop derives inter-shot complex weights from inter-shot accelerometer signals and inter-shot hydrophone signals. The intra-shot adaptive processing loop models bulge wave noise in the intra-shot hydrophone signals by combining the inter-shot complex weights with intra-shot accelerometer signals. Bulge wave noise attenuation is achieved by subtracting the intra-shot bulge wave noise model from the intra-shot seismic detector signals.

Other types of noise, such as crossflow noise generated when the streamer is subjected to cross-currents, have characteristics that are similar to the characteristics of this bulge wave noise. Crossflow noise is a particularly significant problem when the seismic survey vessel and streamers are being turned during a seismic survey. The level of crossflow noise is typically so overwhelming during turns that seismic data recording is simply stopped while the vessel is being turned. Prior art seismic data signal processing methods have failed to adequately attenuate these types of noise as well.

It is therefore an object of the present invention to provide methods and apparatus for reducing the effects of noise, such as swell noise, in marine seismic surveys.

SUMMARY OF THE INVENTION

According to one aspect of the present invention, there is provided a seismic acquisition system comprising: a streamer for receiving seismic signals reflected from strata beneath a body of water, the streamer comprising a plurality of hydrophones distributed at average intervals of not more than 500 cm therealong; analogue-to-digital converter means receiving and digitizing analogue signals of the hydrophones to generate for each hydrophone a separate digitized signal; and a filter receiving as input the digitized signal together with the digitized signal of at least one nearby hydrophone and generating a signal with reduced noise content.

According to another aspect of the present invention, there is provided a method of performing a marine seismic survey, the method comprising:

towing at least one seismic streamer comprising a plurality of hydrophones distributed at average intervals of not more than 500 cm therealong in the water over the area to be surveyed;

directing acoustic signals down through the water and into the earth beneath;

receiving with the hydrophones seismic signals reflected from strata in the earth beneath the water;

digitizing an output of each hydrophone separately; and filtering said output to reduce the noise present in said output and to generate a signal with a reduced noise content, said filtering step using as a further input the digitized output of at least one nearby hydrophone.

The invention is based on the discovery that the dominant noise components typically have a coherence length of less than 20 meters in the low frequency range. By sampling the wavefield at intervals significantly below that distance to avoid or at least reduce aliasing, and applying an appropriate noise filtering technique, it is possible to reduce the amount of noise in recorded streamer data more efficiently than by known group forming methods. The coherence length of the noise is determined by various parameters, including streamer design, construction, towing and weather conditions.

Specifically, the invention proposes sampling of the wavefield at an average sampling distance of less than 500 cm. This sampling density cannot be achieved by conventional "group-formed" acquisition data, where the output of adjacent hydrophones are wired together. This known technique averages the measurement over the coherence length of the noise, thus rendering it unsuitable for conventional coherent noise filtering methods.

The invention provides a system which can convert the seismic signal as measured by a single hydrophone into a noise-reduced version of the same signal. This noise-reduced signal can be available to subsequent processing steps either in the so-called "pre-stack" domain or the signal can be combined with the noise-reduced signals of other hydrophones in a process commonly referred to as "stacking".

The term "adjacent hydrophones" is meant to include directly neighboring hydrophones, but also cases where the inputs of nearby (but not directly adjacent) hydrophones are used. Preferably, the hydrophone spacing lies in the range 200 cm to 330 cm, and may for example be about 205 cm to 210 cm, or about 305 cm to 315 cm.

Spatio-temporal filtering is preferably applied to attenuate noise from the received signals. Generally it is possible to broadly distinguish in seismic surveys between noise and seismic signal in terms of frequency, direction of propagation and (apparent) velocity.

In accordance with another aspect of the present invention, the filter acts as a beamformer, i.e. discriminating its response in accordance with the spatial and/or temporal spectral content of the input signals.

Preferably the filter is an adaptive filter, even more preferably a filter adapting its filter weights or coefficients under a predefined set of constraints.

In a particularly preferred embodiment the filter comprises M spatially and/or temporally local multichannel adaptive filters with K channels, each of a length L. For most applications, the numbers M, K and L are equal to or larger than two.

The use of a filter bank for noise attenuation of seismic signals has been described in International Patent Application No. WO97/25632. However, the present invention does not require defining a reference channel in order to calculate the adapted filter bank coefficients. In other words, no noise estimate enters the adaptation process. Therefore, the present method can be applied to noise contaminated seismic signals, where there is no independent measurement or estimate of the noise available.

According to one aspect of the invention, the coefficients of the filter bank are constrained such that its response corresponds to that of a beamformer with a specified look-direction.

The method can be performed on stored data or on raw seismic data as it is acquired. Thus raw seismic data may be filtered according to the method at the data acquisition site. This ensures that a "cleaned" signal is available from the data acquisition site and may be downloaded directly from the site in this form. This reduces the amount of data that must be sent for analysis off-site and reduces the costs and storage problems associated with accumulating sufficient quantities of noisy data for analysis off-site. The method can be applied to single-sensor recordings, i.e. to recordings prior to any group forming which combines the signals of two or more seismic sensors.

These and other features of the invention, preferred embodiments and variants thereof, possible applications and advantages will become appreciated and understood by those skilled in the art from the following detailed description and drawings.

DETAILED DESCRIPTION OF SPECIFIC EMBODIMENTS

Figure 1A:
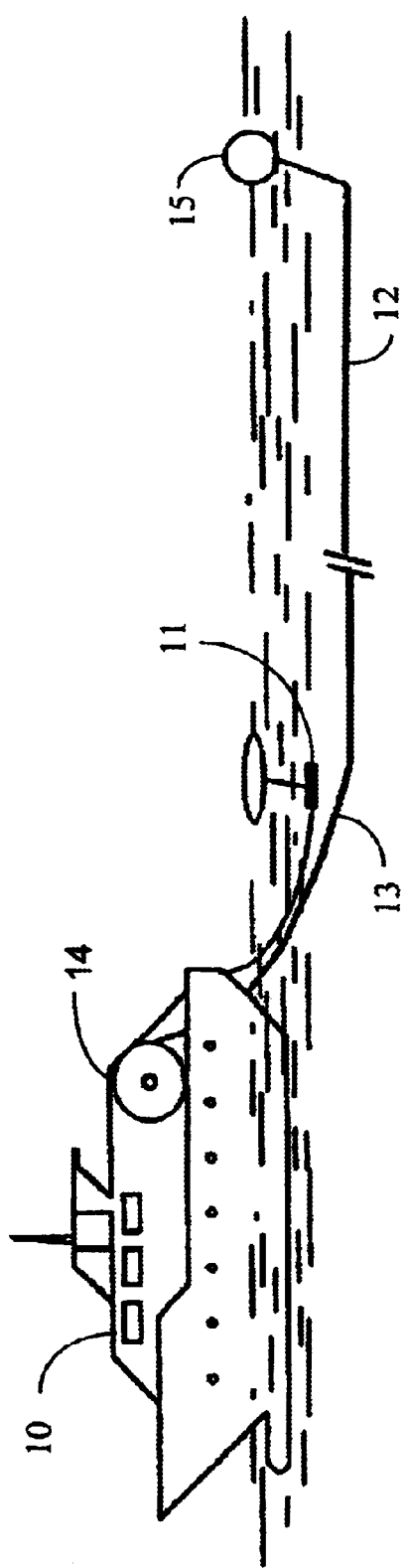
FIG. 1A is a generalized illustration of a seismic survey vessel towing an array of seismic streamers in accordance with a first implementation of the invention.

FIG. 1A shows a seismic vessel towing an acoustic source and streamer through a body of water. The seismic vessel 10 pulls at least one seismic source 11 and at least one seismic streamer 12. The streamer 12 is secured to the vessel 10 by a lead-in cable 13 which is attached to a cable storage reel 14 located aboard the vessel. A tail buoy 15 is attached to the distal end of the cable by a long stretch of rope or similar material. The tail buoy may optionally be provided with an acoustic, electromagnetic or visual device used to locate the end of the streamer cable.

Figure 1B:
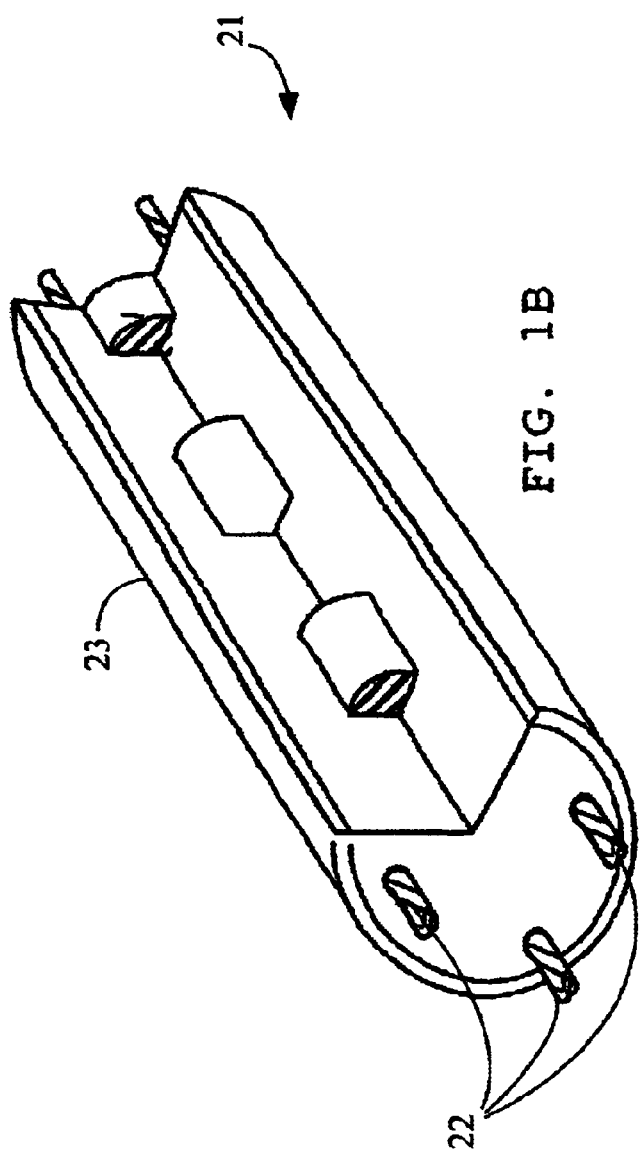
FIG. 1B is a schematic cross-section illustrating a portion of a streamer cable employing an embodiment of the present invention.

As shown in FIG. 1B, each section of the streamer cable 12 contains a plurality of hydrophones 21 well known in the seismic art. The hydrophones are interconnected by a transmission line (not shown) to a remote recording device located aboard the vessel. Adjacent hydrophones are not wired so as to form groups which generate a single output. Instead, each hydrophone is set to generate a separate output $g_i$ which is subsequently filtered in a process as described below.

In addition the streamer cable contains stress members 22 designed to absorb the tensional stress applied to the cable while in tow. The sensing and strength components are surrounded by a plastic jacket 23 in the form of an elongated tube. The jacket is preferably filled with a lightweight ballast fluid to render the section neutrally or slightly positively buoyant. When full of fluid, the interior of the jacket is substantially at atmospheric pressure. The cylindrical form of the jacket is maintained by a plurality of bulkheads which are not shown.

As the streamer cable is towed through the body of water, air guns 11 are fired and the thus generated acoustic energy travels through the water layer and the formations beneath the ocean bottom. At various reflection points or planes, part of the acoustic energy is reflected. The hydrophones 21 cable receives the direct wavefield and any reflected or refracted wavefield traversing the streamer. The received wavefield is in most case heavily contaminated by noise from various sources.

To attenuate the unwanted noise in the received signals, the hydrophones 21 may be spaced at intervals of 3.125 meters. Even though experimental data suggests that better noise attenuation can be achieved with sampling intervals of 2.25 meters, optimal spacing is subject to a number of restrictions, such as available bandwidth for data transmission and recording or manufacturing costs. The above values for the hydrophone separation are derived from a wet (kerosene filled) streamer cable and modification of the sampling interval might be necessary for other types of streamers, such as solid and semi-solid streamers.

In combination with an appropriate noise filtering methods as for example described below, the above chosen sampling spacing results in the reduction of unwanted noise, particularly coherent noise, such as bulge wave noise, swell noise, and crossflow noise.

Figure 2:
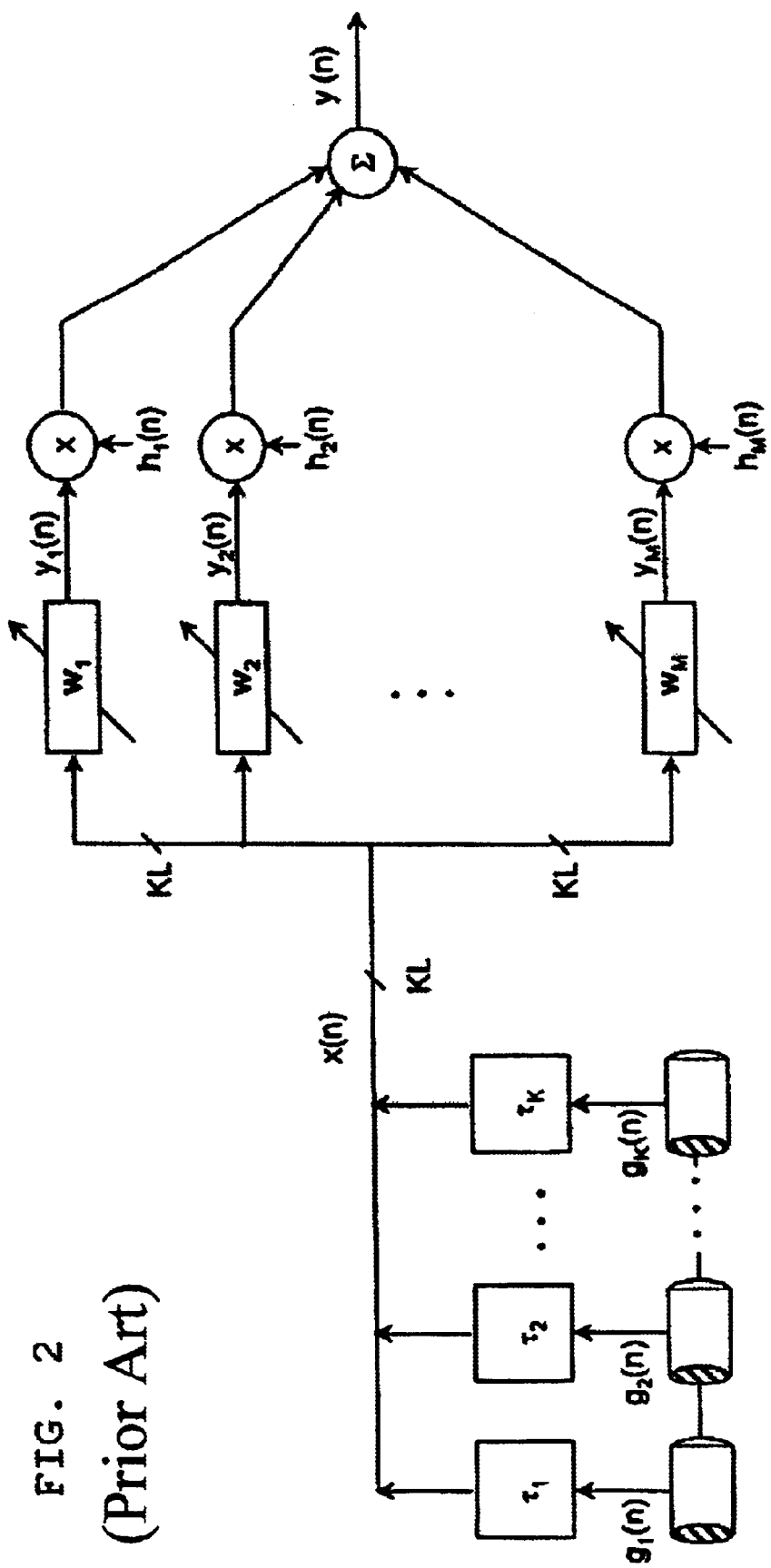
FIG. 2 shows a general block diagram of an adaptive beamformer in accordance with the present invention.

Referring now to FIG. 2, there is shown a general block diagram of an adaptive beamformer used as filter to reduce the noise of the single sensor recordings. It is assumed the presence of K sensors located at rk with k=1, . . . , K. Each sensor k records signal $g_k(n)$ with n=1, . . . , N using an A/D converter. The letter 'n' is used as an index on discrete time samples. The sampling interval is $\Delta t$. The signals $g_k(n)$ are beamsteered using delays $\tau_k$ towards a general "signal direction". This is the general direction from which the seismic signals are expected to arrive. The beamsteered channels $x_k(n)$ are processed by local multichannel adaptive filters to produce the output signal:

$$y(n) = \sum_{i=1}^{M} \sum_{k=1}^{K} \sum_{v=-L_1}^{L_2} h_i(n) w_{ikv} x_k(n-v) \quad [1]$$

where $w_{ikv}(t)$ are the adjustable coefficients of the adaptive filters, $h_i(n)$ are the windows applied at the output end, M is the number of local multichannel adaptive filters (or the number of output windows), and $L = L_1 + L_2 + 1$ is the number of coefficients per channel. Here and below, a bar under a letter denotes a vector (small letter) or a matrix (capital letter)

Equation [1] can be rewritten as a (windowed) sum over a scalar product using a tap-input vector $\underline{x}(n)$ at time t defined as:

$$\underline{x}(n) = [x_1(n+L_1), \ldots, x_1(n-L_2)$$
$$x_2(n+L_1), \ldots, x_2(n-L_2),$$
$$x_k(n+L_1), \ldots, x_k(n-L_2)]^T \quad [2]$$

and a tap-weight vector $\underline{w}_i$ defined as $$\underline{w}_i = [w_{i1}(-L_1), \ldots, w_{i1L_2}, w_{i2(-L_1)}, \ldots, w_{i2L_2}$$
$$w_{iK(-L_1)}, \ldots, w_{iKL_2}]^T \quad [3]$$

Using definitions [2] and [3], equation [1] becomes $$y(n) = \sum_{i=1}^{M} h_i(n) \underline{w}_i^T \underline{x}_k(n) = \sum_{i=1}^{M} h_i(n) \underline{x}^T(n) \underline{w}_i. \quad [4]$$

Equations [1] and [4] describe how to find the beamformer or filter bank output once the M tap-weight vectors $\underline{w}_i$ have been specified. These vectors are computed as the solution of an optimization problem which is described below.

The optimization problem is defined as $$\min_{\underline{w}_1, \ldots, \underline{w}_M} J = \min_{\underline{w}_1, \ldots, \underline{w}_M} \left\{ J_1 + \frac{\delta^2}{KL} J_2 \right\} \quad [5]$$

subject to constraints $$\underline{C}^T \underline{w}_i = \underline{f} \quad [6]$$

where i=1,2, . . . , M and $$J_1 = \sum_{n=1}^{N} y^2(n) \text{ and} \quad [7]$$

$$J_2 = \sum_{i=1}^{M} \|\underline{w}_i\|^2 \sum_{n=1}^{N} h_i(n) \|\underline{x}(n)\|^2, \quad [8]$$

KL is the total number of filter coefficients, and $\|.\|$ denotes the $L_2$ norm. This cost function is a linear combination of the output power of the beamformer (the first term in eq. [5]), and the so-called "white-noise gain" of the beamformer weighted by the input power (the second term in eq. [5]). The relative weight of the two terms is adjusted by the $\delta^2$ term. Including the "white-noise gain" of the beamformer in the cost function is intended to increase the beamformer robustness in the presence of signal modeling uncertainties (sometimes called perturbations) and numerical correlation between the signal and the noise.

Equation [6] describes Q linear constraints on the admissible solutions to the optimization problem. Here, the KLxQ matrix $\underline{C}$ is the constraint matrix, and the Q-vector $\underline{f}$ is the response vector. The actual design of the linear constraints are discussed below.

A possible solution of the optimization depends on imposing the following two constraints on the window functions $h_i(n)$:

$$\sum_{i=1}^{M} h_i(n) = 1 \quad [9]$$

for n=1, 2, . . . , N, and $$h_i(n) h_j(n) = 0 \quad [10]$$

for j <> i−1, i, i+1. The first constraint ensures that the filter bank is equivalent to the single filter case if all the local filters ($w_i$) are identical. The second constraint ensures that the windows have compact support.

The optimization problem can be to a large extent decoupled using the second condition(eq. [10]), and the approximation $$\sum_n \sum_i \sum_{j=i-1,i+1} h_i(n)h_j(n)\underline{w}_i^T \underline{x}(n)\underline{x}^T(n)\underline{w}_j \approx \qquad [11]$$

$$\sum_n \sum_i \sum_{j=i-1,i+1} h_i(n)h_j(n)\underline{w}_i^T \underline{x}(n)\underline{x}^T(n)\underline{w}_i$$

The approximation of equation [11] requires that neighboring filters produce similar results when applied to the same input data in time regions where adjacent windows overlap, instead of requiring that neighboring filters are similar on a point-by-point basis. Thus, the approximation is similar to requiring that the integral of two functions are close, rather than the functions themselves.

With this approximation, the first term of the cost function, $J_1$, becomes $$J_1 = \sum_{i=1}^M \underline{w}_i^T \Phi_i \underline{w}_i \qquad [12]$$

with $$\Phi_i = \sum_n h_i(n)\underline{x}(n)\underline{x}^T(n). \qquad [13]$$

The second term in the cost functional can be rewritten as:

$$J_2 = \sum_{i=1}^M \|\underline{w}_i\|^2 tr\left\{\sum_{n=1}^N h_i(n)\underline{x}(n)\underline{x}^T(n)\right\}, \qquad [14]$$

with "tr" denoting the trace of a matrix.

Combining Equations (5), (12), (14), and reorganizing the terms, the total cost functional can be written as:

$$J = \sum_{i=1}^M \underline{w}_i^T \left\{\Phi_i + \frac{\delta^2}{KL} tr(\Phi_i)I\right\} \underline{w}_i, \qquad [15]$$

where $\underline{I}$ denotes the KL×KL identity matrix. The decoupled optimization problem can be solved for each of they M time windows subject to the constraints [6]. Using the method of Lagrange multipliers, the optimal tap-weight in each window is given by $$\underline{w}_i^* = \tilde{\Phi}_i^{-1} \underline{C}(\underline{C}^T \tilde{\Phi}_i^{-1} \underline{C})^{-1} \underline{f}, \qquad [16]$$

with $$\tilde{\Phi}_i = \Phi_i + \frac{\delta^2}{KL} tr(\Phi_i)I, \qquad [17]$$

The second term of the modified local correlation matrix $\tilde{\Phi}_i$ can be regarded as a regularization term with $\delta^2$ as the regularization parameter. In array signal processing literature, regularization of correlation matrices with the addition of a scaled identity matrix has been suggested to increase robustness in the presence of perturbations, in the context of narrow-band beamforming. Here, the cost function [5] includes the regularization term from the beginning leading to a generalization for wide-band adaptive beamforming. Hence, the filter response changes as a function of the frequency of the signal.

When the input data to the beamformer is characterized by spatially and temporally uncorrelated (or white) noise, both the correlation matrix $\Phi_i$ and the modified correlation matrix $\tilde{\Phi}_i$ proportional to the identity matrix. In this case, the optimal weight vector becomes $$\underline{w}_i^* = \underline{w}_q = \underline{C}(\underline{C}^T\underline{C})^{-1}\underline{f}. \qquad [18]$$

The weight vector $w_q$ is called the quiescent solution to the optimal beamformer problem, and the corresponding response is known as the quiescent response. Note that the quiescent solution depends entirely on the constraint matrix $\underline{C}$ and the response vector $\underline{f}$.

The optimal weight vector $w_i$ approaches the quiescent weight vector $w_q$ even for general noise fields as the regularization parameter $\delta^2$ is increased. In this case, the modified correlation matrix $\tilde{\Phi}_i$ approaches the identity matrix (cf. [17]). The regularization parameter $\delta^2$ therefore weights the optimal solution between a solution that is entirely dependent on the received data, and a solution that is independent of the data. For $\delta^2=1$, both solutions are equally weighted in the sense that their corresponding correlation matrices have equal trace value. In situations where the perturbations are higher, i.e. the assumptions about the seismic acquisition geometry do not exactly hold, finding a beamformer response with a higher level of regularization can give more robust results., Another aspect of the invention relates to the design of linear constraints (eq. [6]) to be imposed on the beamformer.

One type of linear constraints that can be imposed on the beamformer are those designed to preserve seismic signals incident from a target direction, while suppressing interferences incident from other directions. Steering delays $\tau_k$ such as those shown in FIG. 2 define a single "look-direction". Signals incident in this direction are in phase, and for these signals the system can be considered as a single FIR (finite impulse response) filter. The values of the coefficients for this equivalent processor are equal to the sums of the corresponding coefficients in the adaptive processor. Each local beamformer $w_i$ consists of the adaptive filters $w_{i1}$, $w_{i2}$, ..., $w_{iK}$ processing data from each channel, and a summing unit. The sum of the individual filters $w_{i1}$, $w_{i2}$, ..., $w_{iK}$ is constrained to give $\underline{w}_{eq}$, which is the desired response for signals incident in the look-direction, e.g., a unit pulse in the look direction:

$$\sum_{k=1}^K \underline{w}_{ik} = \underline{w}_{eq}, \qquad [19]$$

for i=1, ..., M and $w_{ik}$ being partitioned according to $$\underline{w}_i = [\underline{w}_1^T, \underline{w}_2^T, \ldots, \underline{w}_K^T]^T.$$

The linear constraint equations [6] can be rewritten as the matrix equation $$\underline{C}^T \underline{w}_i = \underline{w}_{eq} = \underline{f}, \qquad [21]$$

where the KL×L matrix $$\underline{C} = [\underline{I}, \underline{I}, \ldots, \underline{I}]^T, \qquad [22]$$

is the constraint matrix, and $\underline{I}$ is the L×L identity matrix.

For a distortionless response in the look direction, $\underline{w}_{eq}$ can be chosen as a unit impulse, e.g.

$$\underline{w}_{eq} = [0, 0, \ldots, 0, 1, 0, \ldots, 0]^T. \qquad [23]$$

The quiescent response then becomes that of a fixed-weight beamformer with single equal weights for all elements. In the frequency-wavenumber domain, this corresponds to a sync function that is constant in the f direction. Therefore, for increasing values of the regularization parameter $\delta^2$, the beamformer preserves signals incident not only from the look direction, but also from neighboring directions.

While in no way limiting the inventive method and system, example processing parameters may include using seven input traces at 3.125 meter spacing, an 11 point filter length, an 83 point window length, 16 millisecond resampling using the quadrature mirror filter technique, standard FK decomposition for higher sub-bands, and a 0.2 regularization factor.

The inventive method and system may be implemented in a wide variety of alternative embodiments. The hydrophones may be distributed along the streamer at regular or irregular intervals and the streamers may be wet, solid, or semi-solid. While the analogue-to-digital converter means are preferably located near the hydrophones, they could alternatively be located more remotely, or even could be located on the seismic survey vessel. Filtered output signals can be generated and recorded for each of the hydrophones. This would typically be done by filtering the digitized signal produced by each hydrophone together with the digitized signals produced by the nearest N hydrophones on either side of the hydrophone (N being an integer greater than or equal to 1, such as 3). Alternatively, the filtering process could be used in connection with digital group forming. In this type of embodiment, for instance, the hydrophone spacing may be 3.125 meters and the spatial separation of the output traces may be 12.5 meters. In this type of embodiment, the filtering process will typically use the digitized signal from the hydrophone positioned at the location of the desired output trace with the digitized signals from between 1 and 4 of the nearest hydrophones on either side of this particular hydrophone. While the filtering will typically utilize an odd number of digitized signals (three or more) when the hydrophone spacing interval is regular (ie producing an output trace for the location of the center hydrophone), the filtering process can also be used to generate a "synthetic" trace located at the center of an even number of digitized signals.

As discussed in the last section, using look-direction constraints and regularization, it is possible to preserve signals incident from directions near the look direction.

What is claimed is:

1. A seismic acquisition system comprising:
    a streamer for receiving seismic signals reflected from strata beneath a body water, the streamer comprising a plurality of hydrophones distributed at average separation intervals of not more than 500 cm therealong;
    analogue-to-digital converter means receiving and digitizing analogue signals of the hydrophones to generate for each hydrophone a separate digitized signal and
    a filter receiving as input the digitized signal together with the digitized signal of at least one nearby hydrophone and generating a signal with reduced noise content.

2. The system of claim 1, wherein the average hydrophone spacing lies in the range 200 cm to 330 cm.

3. The system of claim 1, wherein the response of the filter varies in accordance with the spatial and/or temporal spectral content of input signals.

4. The system of claim 1, wherein the filter is adaptive.

5. The system of claim 1, wherein the filter is a filter bank.

6. A method of performing a marine seismic survey, the method comprising:
    towing at least one seismic streamer comprising a plurality of hydrophones distributed at average intervals of not more than 500 cm therealong in the water over the area to be surveyed;
    directing acoustic signals down through the water and into the earth beneath;
    receiving with the hydrophones seismic signals reflected from strata in the earth beneath the water;
    digitizing an output of each hydrophone separately; and
    filtering said output to reduce the noise present in said output to generate a signal with a reduced noise content, said filtering step using as a further in put the digitized output of at least one nearby hydrophone.

7. The method of claim 6, wherein said filtering substantially attenuates swell noise present in said output.

8. The method of claim 6, wherein said filtering substantially attenuates cross flow noise present in said output.

9. A method of processing marine seismic data acquired by towing at least one seismic streamer comprising a plurality of generally uniformly spaced hydrophones distributed at intervals of not more than 500 cm therealong in the water over the area to be surveyed, directing acoustic signals down through the water and into the earth beneath, and receiving with the hydrophones seismic signals reflected from strata in the earth beneath the water, the method comprising:
    digitizing an output of each hydrophone separately; and
    filtering such output to reduce the noise present in said output and to generate a signal with a reduced noise content, said filtering step using as further input the digitized output of at least one nearby hydrophone.

* * * * *